United States Patent Office 3,322,503
Patented May 30, 1967

3,322,503
SILICON PRODUCTION PROCESS
Harry Bloom, Hobart, Tasmania, Australia, and William L. Jolly, El Cerrito, Calif., assignors to the United States of America as represented by the United States Atomic Energy Commission
No Drawing. Filed May 20, 1964, Ser. No. 369,025
5 Claims. (Cl. 23—223.5)

The present invention relates to the production of elemental silicon and in particular to a process for the more economical reduction of silica to silicon. The invention described herein was made in the course of, or under, contract W-7405-eng-48 with the United States Atomic Energy Commission.

Although silicon compounds are extremely abundant in the earth's crust, conventional techniques for producing elemental silicon require very high temperatures and therefore the product has been expensive. In view of the recent increased usage of elemental silicon, in such fields as electrical semiconductor manufacture, there is a need for a more economical silicon production process.

Present methods for the production of silicon involve the high temperature reduction of silica with carbon, typically at temperatures of the order of 2000° C. forming carbon dioxide and silicon. Adding chlorine to the reduction product forms silicon tetrachloride which is vaporised and removed from the reaction mixture and subsequently purified by distillation. The pure silicon tetrachloride is then reduced by metallic sodium, or other reducing agents, forming the elemental silicon and sodium chloride. The silicon tetrachloride is reduced by other reducing agents, in addition to sodium, as is well understood in the art.

In the present invention, the necessity for extremely high temperatures in the reduction of silica is avoided by the use of a relatively low-temperature liquid melt, in which the reducing element is dissolved. An advantage of the process is the ability to reduce silica directly to silicon at a relatively low temperature, thereby producing a more economical product. Several combinations of reducing agent and liquid melt may be used as will hereinafter be discussed in more detail.

More particularly, the invention consists of dissolving an alkali metal or alkaline earth metal, such as calcium, potassium, sodium or the like in a liquid solvent, i.e., a liquid, or melt in which the metal dissolves but does not chemically react. The freezing points of the melts used in the present invention are in the range from about 350° C. to about 550° C. It is important to the reactions involved that the solvent, or melt, be completely free of water, or alkaline hydroxides will be formed which will produce side reactions and inhibit the reactivity of the silica. The next step in the practice of the invention is to bubble hydrogen gas through the liquid melt forming the alkali or alkaline earth metal hydride within the liquid melt. The hydrogen is intermixed with an inert carrier-gas, such as helium, thus giving a measure of control to the metal-hydrogen reaction. The alkali or alkaline earth metal hydride thus formed in the melt reduces silica, which is added to the melt, thus forming silicon.

Accordingly it is an object of this invention to provide a more economical process for making elemental silicon.

Another object of this invention is to provide a relatively low temperature process for producing elemental silicon.

Still another object of the invention to to provide a process wherein a liquid melt of relatively low fusion temperature is utilized in reducing the oxidation state of silica.

Another object of the invention is to provide a process wherein a eutectic mixture of comparatively low fusion temperature is utilized as a reaction medium in reducing silica.

Another object of this invention is to provide a process for manufacturing elemental silicon which may readily be controlled.

Considering the invention in further detail, the liquid medium in which the reduction of silica takes place has for its requirements two main criteria. In particular, the medium must dissolve the silica-reducing agent, and it must not react with the reducing agent or the silica. The liquid medium should also have a low melting point, which affords processing economy and ease of operation and control.

It has been found particularly satisfactory in the present invention to use a eutectic mixture of calcium iodide and potassium iodide as the liquid melt, the mixture having a melting point of from about 350° C. to about 375° C. A eutectic mixture offers the advantage of having a minimum fusion temperature, i.e., a temperature lower than the melting point of either purified component. Another advantage of using the eutectic mixture is that no partial crystallization of solids occurs if the temperature of the melt decreases.

The reducing agent or compound is variously any substance which will reduce the oxidation state of the silica. Included in this group are the alkali metal and alkaline earth metal hydrides. In the present invention the metal is dissolved in the melt and the hydride is formed by bubbling hydrogen through the melt. Metals that are suitable for use in the present invention include but are not necessarily limited to calcium, barium, potassium, and lithium. As mentioned previously, the alkali metal should come within the two criteria listed above for the liquid melt.

Giving consideration now to the reactions involved and the associated free energies of reaction in the reduction of silica by the present method, and using calcium as an example for the alkali metal reducing agent, it is seen that:

(1) $$Ca(s) + H_2(g) \rightarrow CaH_2(s)$$
$$\Delta F° = -17,062 \text{ cal./mol.}$$

(2) 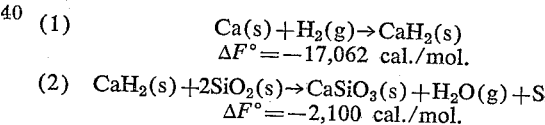
$$\Delta F° = -2,100 \text{ cal./mol.}$$

Where $\Delta F°$ = free energy of reaction of 800° K., cal./mol.

The calcium of Equation 1 is dissolved in the liquid melt as described previously and the hydrogen gas is bubbled through the melt, thus forming calcium hydride, which reduces the silica as shown in Equation 2. An excess of hydrogen will react with essentially all of the calcium dissolved in the melt, and the reaction of Equation 1 will always go to completion. Equation 2 is thermodynamically possible as shown by the minus $\Delta F°$, and has been observed to take place under the correct conditions. Reaction between silicon and hydrogen to form silane, $SiH_4$ was not observed to take place under the described conditions.

The described injection of hydrogen gas is an important step in the process. In experiments using an excess of calcium dissolved in a calcium iodide potassium iodide eutectic, without the use of hydrogen, reduction of silica to silicon was not obtained. This is partially explained by an analysis of the following reactions:

(3) $$2Ca(s) + 3SiO_2(s) \rightarrow Si(s) + 2CaSiO_3(s)$$
$$\Delta F° = -123,800 \text{ cal./mol.}$$

(4) 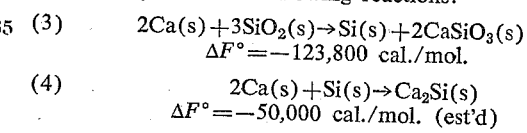
$$\Delta F° = -50,000 \text{ cal./mol. (est'd)}$$

The free energy change ($\Delta F°$) of Equation 4 is estimated at −50,000 cal./mol. at 800° K. Equation 3 is thermodynamically feasible and will occur. However, calcium is always in excess in the reduction and calcium silicide is formed according to Equation 4. Hence no free silicon is obtained as product when hydrogen is not used.

For a further understanding of the practice of the invention reference will now be made to actual examples of reducing silica to silicon.

Solid lumps of fused calcium iodide hexahydrate were mixed with about half their weight of potassium iodide and an equal weight of ammonium iodide. The mixture of salts was heated to remove water of crystallization, the purpose of ammonium iodide being to prevent hydrolysis of the calcium iodide. The dehydration was carried out by heating in vacuo, first at 200° C. then at a higher temperature until anhydrous and molten. The dehydration step has also been performed by the alternate technique of heating small batches of the mixture in an evaporating dish in the strong draft of a fume cupboard to remove ammonium iodide and water. Anhydrous salt mixtures of melting points between 350 and 375° C. were thus obtained.

The calcium iodide/potassium iodide eutectic mixtures thus formed were stored in a desiccator above silica gel until required. As they were extremely hygroscopic it was found difficult in practice to exclude a small amount of water pickup during the subsequent transfer to the reaction vessel. The calcium iodide/potassium iodide anhydrous solid mixture was loaded into a Pyrex reactor together with solid pieces of calcium metal turnings. Different concentrations of calcium metal were found to have no apparent effect on the course of the reaction. Between 2 and 5 mole percent calcium metal was used although as high as 10 mole percent was used in one run. The reactor was heated in an electric furnace in vacuo at 200° C. until the small quantity of water in the system was distilled over into the liquid nitrogen cold trap. Helium was then admitted through a mercury bubbler and the temperature of the reactor was raised until the eutectic mixture melted. After further bubbling of helium through the melt for 40 minutes, the temperature of the reactor was raised to its final operating temperature. In different runs, different final temperatures between 350° C. and 550° C. were used, without causing any apparent difference in the products.

Hydrogen was admitted into the gas stream and a vigorous reaction to form calcium hydride ensued. Helium was cut-off and hydrogen was then used as carrier gas. Silica powder was shaken into the inlet gas stream from a side tube and was carried by the gas flow into the reaction mixture. In other runs, silica gel was used as was "precipitated silica" (silicic acid) previously heated to 150° for 24 hours. In some runs the silica gel was heated to 750° C. for 12 hours in vacuo, before use. The latter method of dehydration effected a better yield of silicon.

The carrier gas was passed through two cold traps, the first containing solid $CO_2$/acetone and the second containing liquid nitrogen, before being allowed to escape into the atmosphere through a mercury bubbler. In the $CO_2$/acetone cold trap, 2 to 3 drops of a neutral liquid condensed during each run. This was shown to have the same vapor pressure as water and it was concluded that water is a reaction product as shown by Equation 2 supra, although there is the possibility that a small trace of water may be present in the initial reactants. Nothing was condensed in the second cold trap during any run; hence silane was not being produced.

After the completion of the reaction, which required approximately one hour, the hydrogen flow was cut off and helium bubbled through the melt to sweep out hydrogen. The reaction tube was then capped, removed from the furnace, tipped onto its side and allow to cool. The solidified melt was stored in a desiccator over silica gel until required for testing.

The solid product was in all cases brownish black and heterogeneous. Part of it reacted vigorously with acids or water evolving hydrogen and leaving a brownish black gelatinous solid. Calcium hydride was always present in excess.

After leaching the products of two runs with 5 N hydrochloric acid, the remaining solids were filtered off, washed well with distilled water and dried at 170°. The brownish black powder which was thus obtained dissolved in hydrofluoric acid and on heating in air, produced a white powder, silica. The product was thus identified as silicon.

While the invention has been described with respect to particular examples thereof, it will be apparent to those skilled in the art that numerous variations and modifications are possible within the spirit and scope of the invention and it is not intended to limit the invention except as defined in the following claims.

What is claimed is:

1. In a process for reducing silica to silicon, the steps comprising forming an anhydrous eutectic melt of metallic halides having a fusion temperature of about 350° C. to about 375° C., dissolving calcium in said melt, bubbling an inert carrier gas through said melt, adding hydrogen to said carrier gas at a controlled rate thereby forming calcium hydride in said melt, and adding said silica to the liquid melt whereby the silica is reduced to silicon by reaction with the calcium hydride.

2. The process described in claim 1, wherein the anhydrous eutectic melt of metallic halides is comprised of calcium iodide and potassium iodide.

3. In a process for reducing silica to silicon, the steps comprising, forming a liquid anhydrous eutectic mixture of calcium iodide potassium iodide having a fusion temperature in the range from about 350° C. to about 375° C., dissolving calcium in said liquid eutectic, bubbling helium carrier gas through said liquid eutectic, adding hydrogen gas at a controlled rate to said helium thereby forming calcium hydride in said eutectic, and adding said silica to said eutectic whereby calcium hydride reduces the silica to silicon.

4. A process for producing silicon comprising forming a liquid anhydrous eutectic mixture of calcium iodide and potassium iodide having a fusion temperature in the range from about 350° to about 375° C., dissolving calcium in said eutectic mixture, bubbling an inert carrier gas through said eutectic, adding hydrogen gas at a controlled rate to said carrier gas thereby forming calcium hydride in said eutectic, stopping the flow of carrier gas, and maintaining an excess of hydrogen bubbling through said eutectic while adding silica to said eutectic whereby the silica is reduced to silicon.

5. The process as claimed in claim 4, wherein the calcium concentration in said liquid eutectic has an upper limit of about 10 mole percent.

References Cited

UNITED STATES PATENTS

| | | | |
|---|---|---|---|
| 857,146 | 6/1907 | Askenasy | 23—204 |
| 1,958,012 | 5/1934 | Muckenfuss | 23—204 |
| 2,555,507 | 6/1951 | Pratt | 23—223.5 X |
| 2,702,281 | 2/1955 | Gibb | 23—204 X |
| 2,884,311 | 4/1959 | Huff | 23—204 |
| 2,898,195 | 8/1959 | Banus et al. | 23—204 |
| 3,116,112 | 12/1963 | Jenkner | 23—204 |

FOREIGN PATENTS

| | | |
|---|---|---|
| 871,614 | 6/1961 | Great Britain. |
| 907,855 | 10/1962 | Great Britain. |

OTHER REFERENCES

"General Chemistry of the Hydrides," pages 16 and 17, NEPA 546–IHR–C9, June 2, 1948, Fairchild Engine and Airplane Corporation, NEPA Division, Oak Ridge, Tenn.

OSCAR R. VERTIZ, *Primary Examiner.*

MAURICE A. BRINDISI, *Examiner.*

E. STERN, *Assistant Examiner.*